UNITED STATES PATENT OFFICE.

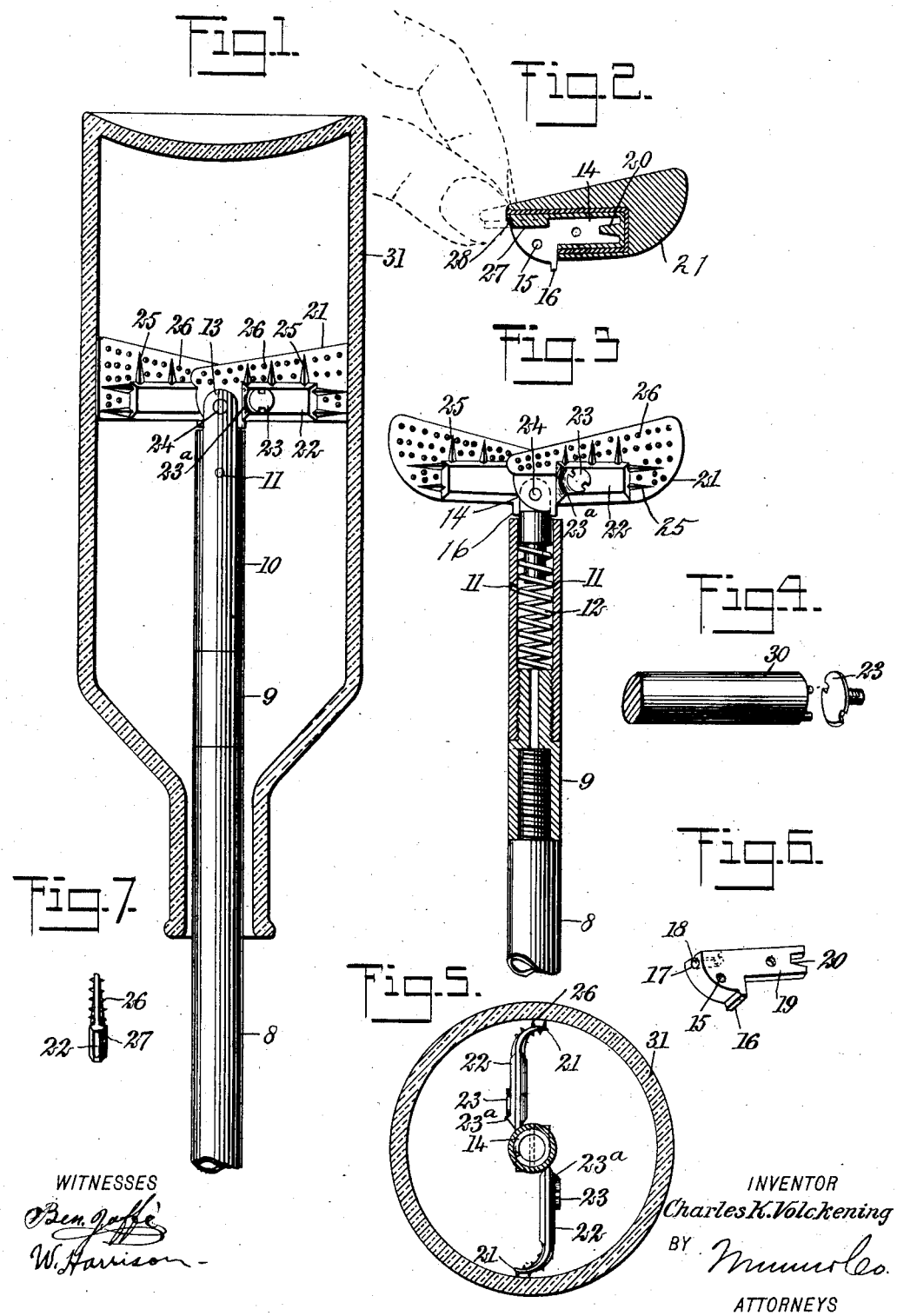

CHARLES K. VOLCKENING, OF NEW YORK, N. Y.

BRUSH FOR WASHING BOTTLES.

No. 906,836.　　Specification of Letters Patent.　　Patented Dec. 15, 1908.

Application filed March 12, 1908. Serial No. 420,749.

*To all whom it may concern:*

Be it known that I, CHARLES K. VOLCKENING, a citizen of the United States, and a resident of the city of New York, borough of Brooklyn, in the county of Kings and State of New York, have invented a new and Improved Brush for Washing Bottles, of which the following is a full, clear, and exact description.

My invention relates to brushes for washing bottles, my more particular object being to provide certain details of construction, so as to produce a bottle washing brush of increased general efficiency.

Reference is to be had to the accompanying drawings forming a part of this specification, in which similar characters of reference indicate corresponding parts in all the figures.

Figure 1 is a vertical section through a bottle, showing how the brush is inserted and indicating how it is operated; Fig. 2 is a longitudinal section through one of the wipers and the arm upon which it is mounted; Fig. 3 is a view partly in plan and partly in section, showing the manner in which the wipers and other supports are mounted; Fig. 4 is a fragmentary perspective showing a screw for tightening the wipers in position upon the wiper-holding arms, and also showing a wrench for turning said screw; Fig. 5 is a section through the device showing its appearance while inserted in a bottle for the purpose of washing the latter; Fig. 6 is a perspective of one of the wiper holding arms; and Fig. 7 is a detail showing in elevation one of the wipers removed from the wiper arm, this view particularly showing the shape of its cylindrical portion and neck integral therewith for affording a good anchorage upon the wiper arm.

A spindle is shown at 8, and mounted upon it is a tubular member 9. A ferrule 10 is screwed upon this tubular member and is provided with educts 11 for the purpose of discharging water into the bottle. A spiral spring 12 is placed within the ferrule 10 and abuts against one end of the tubular member 9. The ferrule 10 is provided with ears 13 integral therewith. Disposed intermediate these ears are wiper arms 14 which are constructed of metal and are each provided with a hole 15. Each wiper arm 14 is provided with a lug 16 which serves as a limiting stop for preventing its excessive movement. Each wiper arm is further provided with a channel 17 and with a narrow opening 18 merging into the channel for the purpose of holding the wiper in position as hereinafter described. Each wiper arm 14 is still further provided with a thin portion 19, the latter having a notch 20.

Wipers are shown at 21 and are made of soft rubber. Each wiper is provided with lugs 22 integral with it. Each wiper is held to its appropriate wiper arm by aid of a screw 23 which extends directly through the lug 22. A pivot pin 24 extends through ears 13 of the ferrule and through the holes 15 of the wiper arms. Each wiper is provided with ribs 25 of rubber, integral with it, these ribs radiating from the lugs 22. Each wiper is further provided with a number of studs 26 integral with it. The ribs 25 and studs 26 are mounted upon both faces of each wiper. Close to each screw 23 and partially encircling the same the wipers each have a reinforced portion 23$^a$.

Each wiper 21 is mounted upon its wiper arm by being merely slipped over it. Each wiper 21 is provided with a portion 27 of substantially cylindrical form connected with it by a neck 28, these parts being integral. The portion 27 is inserted in the channel 17, the neck 28 passing into the opening 18 for the purpose of holding the wiper more firmly upon the wiper arm. In order to do this, the portion 27 is grasped by the fingers so as to stretch the neck 28 in order to allow the subsequent contraction of this neck to pull the portion 27 into the channel 17.

It will be noted that the wiper is molded into exact conformity with the shape of the wiper arm 14 so as to fit neatly thereover. Hence, when the wiper is in position upon the wiper arm, the notch 20 is filled with a portion of rubber integral with the wiper arm. A plunger 29 is engaged by the spring 12 and presses against the wiper arms 14, so as to normally force the latter into the position indicated in Fig. 3. For this purpose the wiper arms are slightly rounded, as will be understood from Fig. 3, so that the pressure of the plunger 29 against the rounded portions of the wiper arms, causes these arms to spring apart relatively to the pivot pin 24 considered as a center. The lugs 16 lodge against opposite sides of the plunger 29 and this prevents the arms from bending backward—that is, toward the spindle 8 while the device is in action.

For the purpose of tightening the screws 23, I employ a wrench 30, shown in Fig. 4, which is provided with projections adapted to enter notches in the screws.

The operation of my device is as follows: The parts being assembled, the wipers 21 are brought together and the ferrule carrying the wipers is inserted in the bottle. The spindle 8 being turned, the studs 26 and ribs 25 are brought into contact with every available portion of the interior of the bottle 31, thereby cleaning it thoroughly, the water meanwhile being forced into the bottle through the educts 11. When the brush is withdrawn from the bottle, the conformity of the bottle neck forces the wipers 21 toward each other, thereby pressing the spring 12 slightly. As soon as the brush is completely removed, this spring and the wipers regain their respective normal positions.

Having thus described my invention, I claim as new and desire to secure by Letters Patent:

1. A device of the character described, comprising a ferrule, a wiper arm pivotally mounted thereupon and provided with a channel and with an opening merging into said channel, and a wiper of resilient material mounted upon said wiper arm and provided with a portion for engaging said channel, and further provided with a neck for entering said opening.

2. In a device of the character described, the combination of a wiper arm provided with a channel and with an opening merging into said channel, and a wiper of resilient material mounted upon said wiper arm and provided with a portion adapted to be stretched for the purpose of engaging said channel and the opening merging thereinto.

3. The combination of a ferrule, a plunger mounted therein and movable relatively thereto, and a wiper arm journaled relatively to said ferrule and provided with a lug for engaging said plunger, said lug thus forming a limiting stop for preventing excessive travel of said wiper arm.

4. The combination of a ferrule, a plunger slidable in relation thereto, wiper arms provided with lugs and pivotally mounted upon said ferrule, and adapted to move relatively to each other so that said lugs are free to engage and disengage said plunger, said wiper arms being further provided with portions engaged by said plunger for the purpose of actuating said arms.

In testimony whereof I have signed my name to this specification in the presence of two subscribing witnesses.

CHARLES K. VOLCKENING.

Witnesses:
WALTON HARRISON,
JOHN P. DAVIS.